US008874533B1

(12) United States Patent
Smith

(10) Patent No.: US 8,874,533 B1
(45) Date of Patent: Oct. 28, 2014

(54) SYSTEM AND METHOD FOR DATA VALIDATION AND LIFE CYCLE MANAGEMENT

(75) Inventor: Timothy R. Smith, Nashville, TN (US)

(73) Assignee: MyWerx, LLC, Nashville, TN (US)

( * ) Notice: Subject to any disclaimer, the term of this patent is extended or adjusted under 35 U.S.C. 154(b) by 576 days.

(21) Appl. No.: 12/728,908

(22) Filed: Mar. 22, 2010

Related U.S. Application Data

(60) Provisional application No. 61/163,159, filed on Mar. 25, 2009.

(51) Int. Cl.
G06F 17/30 (2006.01)

(52) U.S. Cl.
USPC ............ 707/694; 707/794; 707/805

(58) Field of Classification Search
None
See application file for complete search history.

(56) References Cited

U.S. PATENT DOCUMENTS

| 5,765,152 | A | 6/1998 | Erickson |  |
| 5,991,876 | A | 11/1999 | Johnson et al. |  |
| 6,549,894 | B1* | 4/2003 | Simpson et al. | 1/1 |
| 6,658,403 | B1 | 12/2003 | Kuroda et al. |  |
| 6,885,999 | B1* | 4/2005 | Corless | 705/59 |
| 7,123,814 | B2 | 10/2006 | David |  |
| 7,343,321 | B1 | 3/2008 | Hill et al. |  |
| 7,809,695 | B2* | 10/2010 | Conrad et al. | 707/692 |
| 2001/0002485 | A1* | 5/2001 | Bisbee et al. | 713/167 |
| 2002/0002543 | A1 | 1/2002 | Spooren et al. |  |
| 2004/0139327 | A1* | 7/2004 | Brown et al. | 713/176 |
| 2005/0033813 | A1* | 2/2005 | Bhogal et al. | 709/206 |
| 2005/0043960 | A1 | 2/2005 | Blankley |  |

(Continued)

FOREIGN PATENT DOCUMENTS

JP 2003173380 6/2003

OTHER PUBLICATIONS

ASCAP Web Registration for Members, available: http://www.ascap.com/cwrreg/web%20registration%20for%20members.pdf, accessed Jun. 14, 2014.*

(Continued)

Primary Examiner — Christyann Pulliam
Assistant Examiner — Charles Adams
(74) Attorney, Agent, or Firm — Waddey Patterson; I. C. Waddey, Jr.; Gary L. Montle

(57) ABSTRACT

A method is provided of validating details associated with a copyrighted work. The work and associated data are received at a first server from a first party and stored in an online database. The work and the data are further associated with the first party and one or more other parties. The data includes a relationship status between the parties and the work, and details associated with the work. The online database is reviewed for preexisting confirmation of the relationships. Where the relationships are unconfirmed, confirmation requests are transmitted to the one or more other parties via the communications network seeking confirmation of the relationships. Upon confirming said relationships, the other parties are contacted seeking validation or correction of the details provided by the first party. Validated details or corrected details are then received from one or more of the other parties and stored on the online database. In most cases the relationships between the parties and the data being validated are summaries of existing implied or actual contractual relationships. The system will standardize a method of combining ownership information related to copyrights and the legal verbiage required to transfer various rights to create electronic versions of these contracts for the sake of faster and lower cost creation, execution and archiving.

14 Claims, 13 Drawing Sheets

(56) References Cited

U.S. PATENT DOCUMENTS

| | | | |
|---|---|---|---|
| 2005/0075943 A1 | 4/2005 | Potsch et al. | |
| 2006/0167807 A1 | 7/2006 | Aydar et al. | |
| 2006/0195913 A1* | 8/2006 | Popov et al. | 726/28 |
| 2006/0212403 A1 | 9/2006 | Fanning et al. | |
| 2006/0294371 A1* | 12/2006 | Fanning | 713/165 |
| 2007/0016514 A1* | 1/2007 | Al-Abdulqader et al. | 705/37 |
| 2007/0083558 A1* | 4/2007 | Martinez | 707/104.1 |
| 2007/0088622 A1 | 4/2007 | Floyd | |
| 2007/0118801 A1* | 5/2007 | Harshbarger et al. | 715/730 |
| 2007/0174341 A1* | 7/2007 | Saripalli et al. | 707/104.1 |
| 2008/0144883 A1* | 6/2008 | Kacker et al. | 382/100 |
| 2008/0155701 A1* | 6/2008 | Martinez et al. | 726/27 |
| 2008/0215494 A1* | 9/2008 | Corbett | 705/80 |
| 2008/0270286 A1* | 10/2008 | Wilson et al. | 705/37 |
| 2009/0070185 A1* | 3/2009 | Farrelly | 705/10 |
| 2009/0089198 A1* | 4/2009 | Kroutik | 705/37 |
| 2009/0094147 A1* | 4/2009 | Fein et al. | 705/35 |
| 2010/0161499 A1* | 6/2010 | Holcombe et al. | 705/310 |

OTHER PUBLICATIONS

ASCAP Faq, 2007, available: https://web.archive.org/web/20071218101431/http://www.ascap.com/cwrreg/Main__Introd, accessed Jun. 14, 2014.*

* cited by examiner

FIG. 11

SYSTEM AND METHOD FOR DATA VALIDATION AND LIFE CYCLE MANAGEMENT

CROSS-REFERENCES TO RELATED APPLICATIONS

This application claims benefit of the following patent application(s) which is/are hereby incorporated by reference: U.S. Provisional Application No. 61/163,519, filed on Mar. 26, 2009.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The present invention relates generally to a system and method for obtaining and validating data across a communications network. More particularly, the present invention relates to a social networking system and method for harnessing creative or otherwise intellectual input from a variety of sources and further directly validating the resulting data. Even more particularly, the present invention relates to a social networking system and method for receiving materials such as for example copyrightable works, validating details associated with the materials, and life cycle management of the materials and details.

People who wish to obtain permission to use a protected copyrighted work of one kind or another find themselves in a maze of complex, risky and time consuming legal and administrative tasks. In many cases the task is too daunting for potential users having limited budget or with limited time to navigate these tasks, and such works go unused to the detriment of the potential end user, the creator and the owner of the work. In some cases, the work is used without all owners granting permission due to pending ownership disputes or missing information, which results in no payment from the source, or one owner receiving payment on behalf of all owners. Under these scenarios the unpaid owners are left to discover for themselves that a use has occurred and to then collect from a potential adversarial co-owner, creating significant delays and the potential for no payment of royalties to the co-owners and the creators of the work. In other cases where the work is used without obtaining permission due to the logistical difficulties, lengthy and expensive litigation may well result, again a less than optimal result for all parties involved.

The Internet has spawned an ever-increasing number of new works that are digitally available. The unlimited virtual shelf space for such works in the digital world means that the market has the ability to create and publish works that far exceeds the volume of products created for mass commercialization in the traditional market. Further, the various potential commercial uses for these works have just begun to surface. However, the methods for registering these works, permitting access, documenting ownership, and obtaining permission for their use have fallen exponentially behind, and the current market infrastructure and processes cannot accommodate this growth and new demand for digital works.

The Library of Congress manages the predominant system in the United States that was created for registering works of authors and subsequent assignments of rights to others. Registration provides protection in the form of financial awards if infringement occurs, proof of the date of creation. Both were established to promote the advancement of new ideas and technology by encouraging creators to make their ideas public. However, the methods used in the registration process were not designed to optimize the commercialization of a work. Its purpose was to offer protection and a court based dispute resolution process.

Copyright ownership information is currently spread across the globe in literally thousands of disparate databases. These databases and the companies that have created them did so to address specific problems for specific types of rights. Some examples include those that operate under government consent decree to license and collect royalties for performance rights from radio and television stations, or those that operate under the rigid guidelines of the FCC because of the limited number of frequencies available. The Internet by contrast has no such limits, and the number of potential licensing sources that must be navigated is staggering. None of these prior databases are capable of accommodating automated, high volume, small fee transactions due in part to the cost of registering and maintaining a database of this information, and further most of the works on the Internet are not affiliated with the associated systems.

The disparate databases are further problematic in that some still require paper to communicate submissions to their databases and all still require paper documentation to communicate changes in ownership. This documentation then requires a review and manual data entry to make the changes. A single work may have to undergo this process for each of the creators and/or business partners in the supply chain, assuming all the relevant parties can even be identified or located. The estimated computer hardware, software and labor costs can be daunting under the circumstances.

The database problems are even further complicated by the unmet need for continuous lifecycle ownership management. A work moves through various stages as it progresses from creation to its later stages, and the business transactions and life changes of its creators impact the ownership and royalty participant information. As one example, in the creation stage two creators wish to collaborate on a work of one of the creators, either changing the ownership of the original work or establishing a new work. Further, many common life events such as death, divorce or business agreements have tremendous effect on ownership of the work and its associated royalties. The current available systems for documenting ownership transfers and communicating changes to all interested parties in a work, do not provide a cost effective or time efficient method for managing these processes.

Therefore, a number of needs in the digital world exist that are quite simply unmet by the current system. Creators and interested parties to copyrighted works and their consumers need to be able to find each other and collaborate more effectively.

BRIEF SUMMARY OF THE INVENTION

A system and method in accordance with various aspects of the present invention has been provided for online receipt, validation, registration and management of data, in a particular example creative works. The system is a social network oriented organization that is accessible by interested parties or other third parties via a communications network. Further, the system manages the authorship and ownership details of digital products like songs, sound recordings, photos, videos and software programs, over their entire life cycle from the moment of creation to the time they enter the public domain. At its core it involves storing and validating the ownership information of a work and every document that transfers ownership throughout its life cycle. These transfers affect licensing and royalty obligations, among others. Notification to interested parties is a benefit provided by the system, both with regards to a change in ownership status or of contradictory information which may identify potential disputes.

The system enables lifecycle ownership and transfer management of copyrights for the global market of digital content. A combination of system functions, subscription services, supply chain partner integrations, and global sourcing provide rights owners with the lowest possible cost of service. Some services and capabilities include creator claim validation, proof of creation, assignment of rights automation, representative contract validation, dispute resolution, partner channel integration, direct automated clearance/licensing and royalty accounting. These services and capabilities may be delivered through a social communications network and associated user interface software as a service model.

The system and method encourage early and efficient validation of ownership through agreement of the ownership "details" between interested parties. The details are the claimants of a work (the authors and their business representatives), and their respective authorship and/or ownership shares further detailed by exclusive rights granted and territory covered under the grant. These ownership shares, for example, are not readily available under the current copyright registration system through the Library of Congress.

Reaching agreement early in the creation process eliminates a delay that a work might experience as it enters the market place of licensable works. Many creators initially fear releasing their works to the market place based on concerns that someone may steal their idea. Establishing proof of creation and validating the relevant details provides an inexpensive precursor to one day filing a formal copyright registration with the Library of Congress and/or similar institutions in countries outside the US, and further encourages prompt release of a new work to the viewing public. Storing ownership information and facilitating ownership transfers throughout the life cycle of a work further enables real time clearance opportunities for interested users of a work.

The system can be managed in a social network environment using workflow automation tools and best practice processes to expedite workflow processes. Business logic will calculate the resulting changes to ownership splits. Validation rules will ensure that all parties agree to new ownership percentages before locking them in the system. Electronic documents which convey ownership interest are automatically created, sent for execution and archived.

Briefly stated, in an embodiment of the present invention a method is provided for efficiently obtaining and validating data for display by third parties. Primary data is received at a data processing system from a first party via a communications network. Secondary data associated with the primary data is also received from the first party. The secondary data is further associated with one or more interested parties including the first party. The primary and secondary data are transmitted from the data processing system to one or more of the interested parties with a request for validation or correction of the secondary data. Validation data is then received from the one or more interested parties which may include validated secondary data, corrected secondary data and/or a lack of response indication. A response by the system is provided depending on the validation data received. Upon validating the data, the primary data and secondary data are displayed in a user interface accessible to third parties via the communications network.

In another embodiment of the present invention, a method is provided of validating details associated with a copyrighted work. Details associated with the work are received from a first party via a communications network, and the details are stored in an online database. The work and the data are associated with the first party and one or more other parties, with the data including a relationship status for one or more of the parties and the work. The online database is reviewed for preexisting confirmation of the relationships, and where the relationships are unconfirmed confirmation requests are transmitted to the other parties via the communications network. Upon confirming the relationships, one or more of the details are transmitted to the other parties seeking validation or correction from the parties of the details as provided by the first party. Validated details or corrected details are then received from other parties via the communications network and stored on the online database. An online user interface is provided facilitating access to the confirmed relationships and validated details.

In another embodiment of the present invention, a system is provided for validating details associated with a copyrighted work. An online database and a user interface reside on a web server accessible via a social communications network and hand held mobile devices. A data processor is operatively connected to the database and to the user interface and includes a plurality of software modules. A data receiving module receives a copyrighted work and details associated with the work from one or more interested parties associated with the work. A data storing module stores the work and the details associated with the work on the online database. A validation module receives validated details from the interested parties, and further transmits a validation request to any of the interested parties from whom validation of the details has not been received. A correction module receives corrected details from the parties, and further transmits a validation request to any of the interested parties from whom the corrected details were not received.

BRIEF DESCRIPTION OF THE SEVERAL VIEWS OF THE DRAWINGS

FIG. 11 is a modified screenshot showing a screen from another embodiment of a user interface of the present invention.

DETAILED DESCRIPTION OF THE INVENTION

Figure 1:
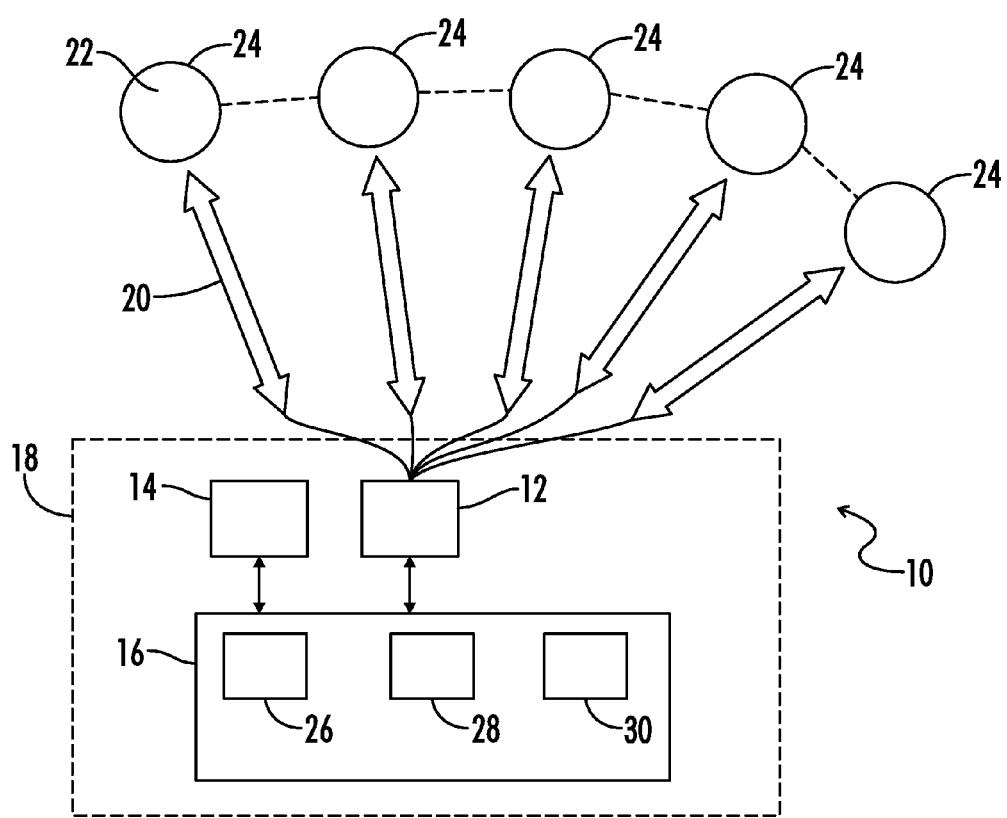
FIG. 1 is a block diagram of an embodiment of a data validation system in accordance with the present invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may. A "communications network" as used herein may generally refer to a global communications network such as the Internet but may further include various remote and local communications network alternatives as well known in the art wherein a server may be accessed via wireless, broadband, LAN, WAN and the like.

Where the various figures may describe embodiments sharing various common elements and features with other embodiments, similar elements and features may be given the same reference numerals and redundant description thereof omitted below.

Referring generally to FIGS. 1 to 11, various embodiments of a system and method are described herein for obtaining, validating and managing data across a communications network. The system and method may apply generally in various embodiments to any application where data may collectively be stored, validated by interested parties, corrected and presented for display to third parties. The present invention generally allows for more efficient access to and distribution of current and valid information. In more particular embodiments as described herein, the present invention may relate to receiving copyrighted materials and/or associated details from a first party, validating the details associated with the materials with interested parties, and various additional facets of life cycle copyright management.

Referring to FIG. 1, in various embodiments a data validation and management system 10 includes a user interface 12, an online database 14, and a data processor 16 or data processing system 16 operatively linked to the user interface 12 and the database 14. The user interface 12 may be integral with the data processing system 16 as shown, or may alternatively embody a separate program. Generally the components of the system 10 may reside on a single web server 18, but in alternative embodiments various components may reside on separate servers that are operatively linked as well.

The data processing system 16 in various embodiments includes a number of software modules programmed to execute the functions of the system 10. The modules in the embodiment shown in FIG. 1 include a data receiving module 26, a data storing module 28, and a validation module 30. In various embodiments one or more of the modules may be included within a single executable program. The designations given to particular modules are primarily for descriptive purposes only, as the system instead may be described as merely including one or more computer programs as known in the art having executable instructions effective to carry out a number of features as further described herein, without limiting the system to a particular software platform or equivalent structure. Therefore, the disclosure herein may describe a common processing system having a computer program executable to perform functions in response to for example predetermined criteria and/or various external acts such as data received from a user.

The user interface 12 in various embodiments may be accessible via a communications network 20 to the public using a secured entry system or a social networking platform as known in the art. A "social communications network" as used herein may further refer to a network wherein the user interface 12 includes a website or the equivalent which is generally accessible to members of the public by the communications network 20.

The user interface 12 of the system 10 may actually include various user interfaces which are customized to provide user access via a stationary (i.e., desktop computers) or portable electronic device (i.e., smart phones, laptop computers) capable of interaction across a local or global communications network (i.e., the Internet).

Referring to FIGS. 10a-10e, an embodiment of a user interface 12 associated with the system 10 may be briefly described, the user interface 12 in this example being an application configured for display and use with regards to a portable device such as a smart phone. These applications may allow for simplified or streamlined features with respect to the system and method of the present invention, whereby an interested party may login to the host system, view and respond to requests without actually requiring the party to enter and login to a separate webpage.

Figure 10A:
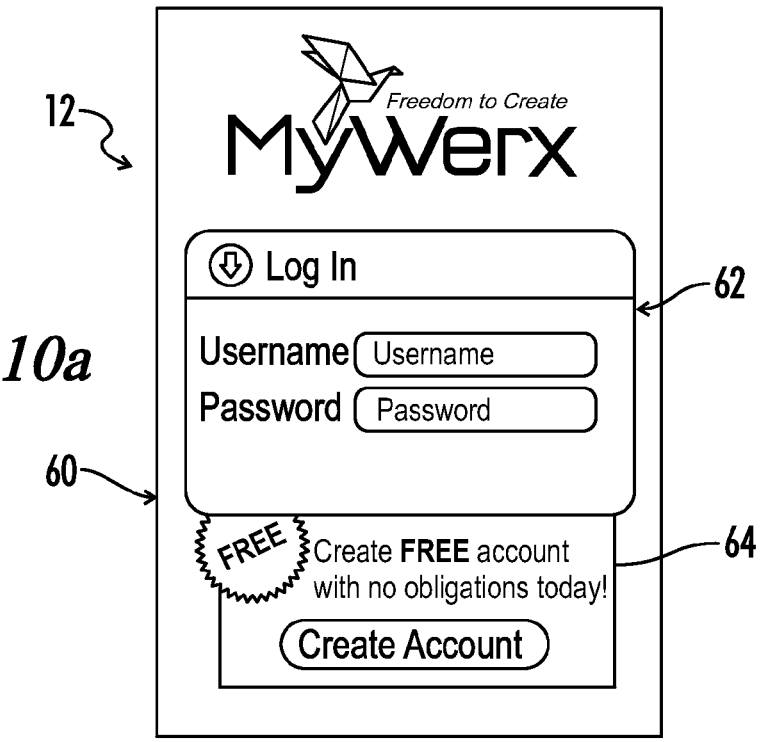
FIGS. 10a-10e are modified screenshots showing various screens from an embodiment of a user interface of the present invention.

FIG. 10a shows a first page 60 of an embodiment of the user interface 12 including links to a login module 62 whereby a preexisting user of the system may login to the system, and an account creation module 64 whereby a prospective user may create a user name and a password. Alternatively, the first page 60 may be configured to recognize a preexisting user and bypass the login module 62.

Figure 10B:
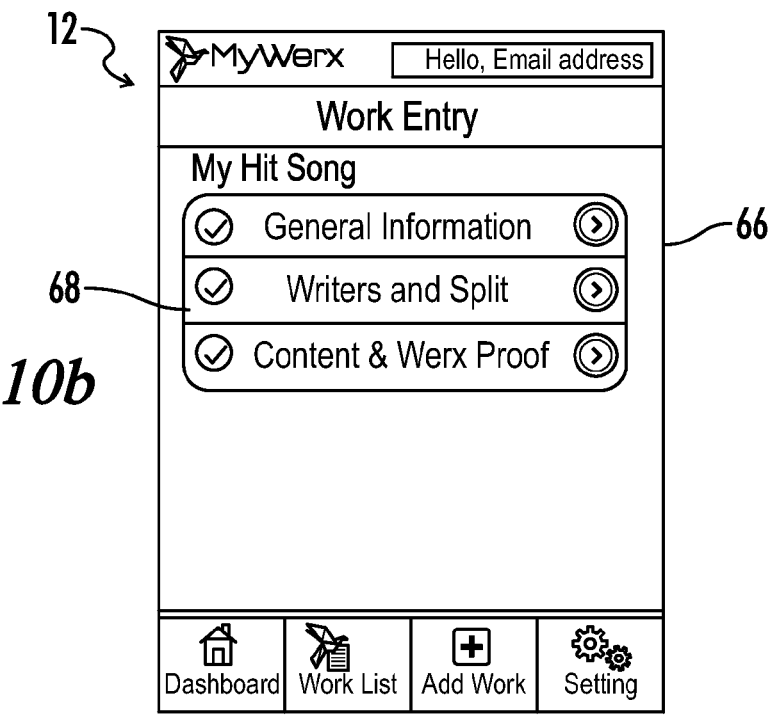

FIG. 10b shows a second page 66 of an embodiment of the user interface 12 including various links 68 to the data receiving module 26 of the data processing system 16 whereby primary and secondary data may be entered by the user. In the example shown, the user may be prompted to enter primary data such as the content of a work, or secondary data such as general information associated with a work and/or information regarding creation and ownership of the work.

Figure 10C:
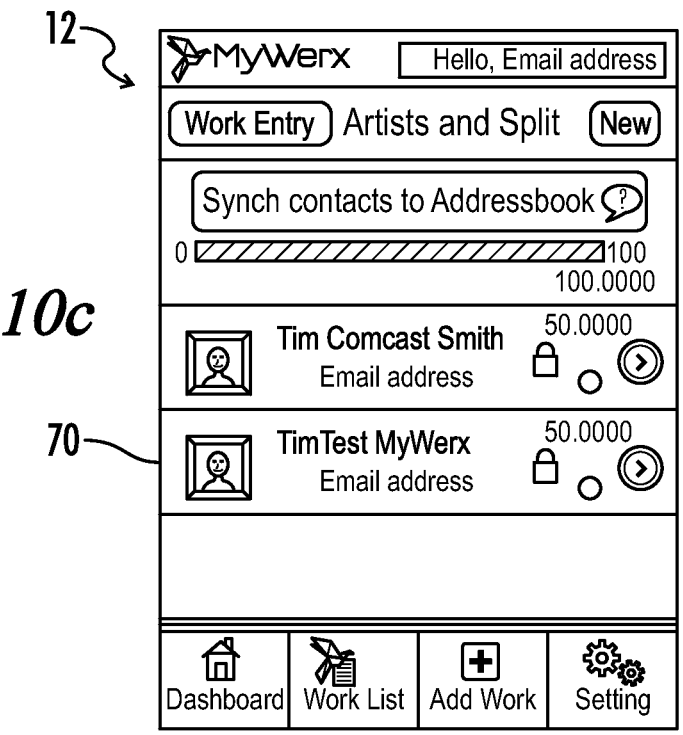

FIG. 10c shows a third page 70 of an embodiment of the user interface 12 whereby a user may view, add or modify information regarding a particular work and creators or owners of the particular work. The user interface 12 in this example may be configured to automatically synchronize information in files within the online database 14 and associated with the various interested parties. For example, the user interface 12 may be configured to synchronize information provided by one user with information stored and displayed with respect to one or more additional and interested users, either within the scope of the user interface 12 or in conjunction with a third party application associated with the electronic devices of the users.

Figure 10D:
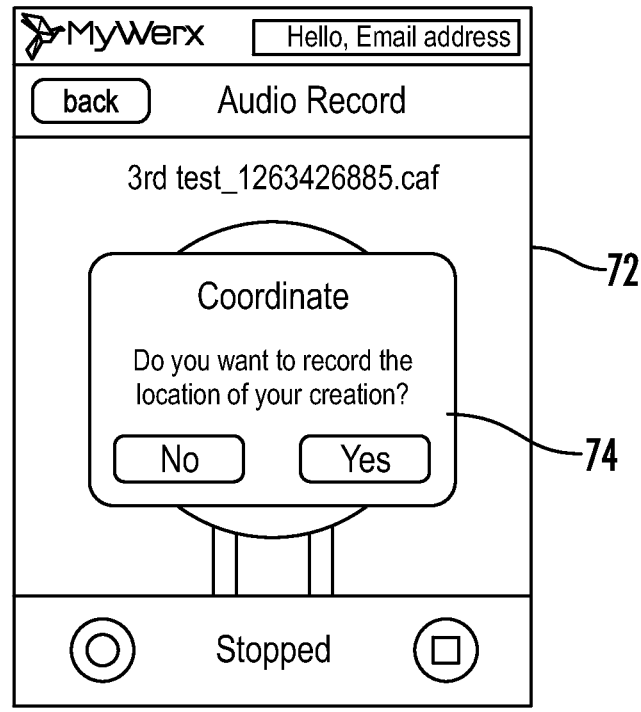

FIG. 10d shows a fourth page 72 of an embodiment of the user interface 12 including a link 74 to the data receiving module 26 whereby a user may upload secondary data associated with primary data. In this example, the user (i.e., creator, author) may enter and prompt the system 10 to store a location where the primary data was created. In various embodiments the date may also be automatically stored alongside secondary data which is manually uploaded by a user.

Figure 10E:
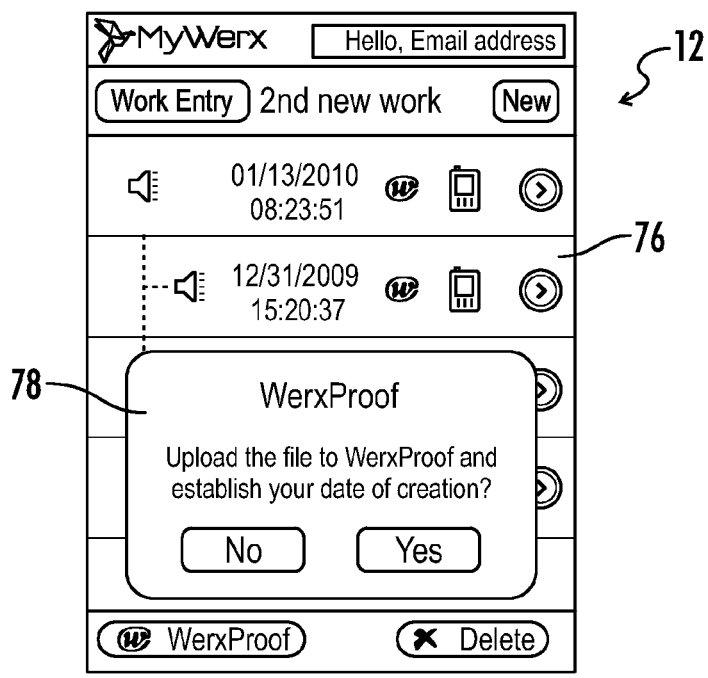

FIG. 10e shows a fifth page 76 of an embodiment of the user interface 12 including a link 78 to the data receiving module 26 whereby a user may upload a new work (i.e., primary data) to the system and establish a date of creation.

Figure 11:
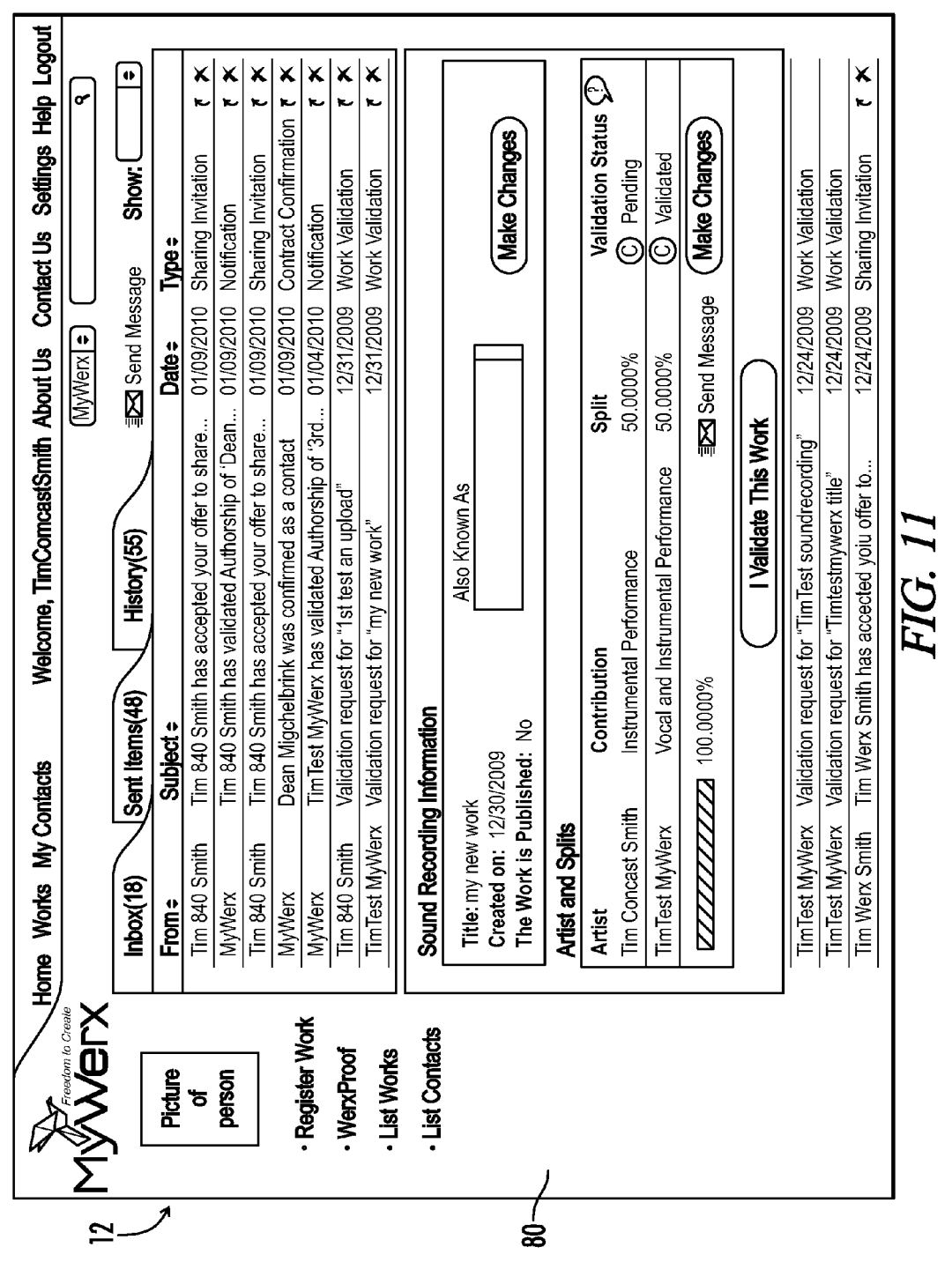

Referring now to FIG. 11, another embodiment of a user interface 12 associated with the system 10 may be briefly described, the user interface 12 in this example being a webpage configured for display and use with regards to any device capable of web browsing such as a desktop computer, laptop or tablet computer, etc. The webpage may allow for more detailed access to features with respect to the system and method of the present invention.

FIG. 11 shows an embodiment of an interactive webpage 80 as the user interface 12. In the example shown, the user may view, validate and modify/correct a work (primary data) and its associated details (secondary data), including but not limited to authorship and ownership percentages, validation status, and communications associated with any interested parties associated with the work.

Various additional embodiments of user interfaces are anticipated within the scope of the present invention, and the pages are shown are not intended as limiting on any additional features that may be provided as might be understood by one of skill in the art.

Figure 2:
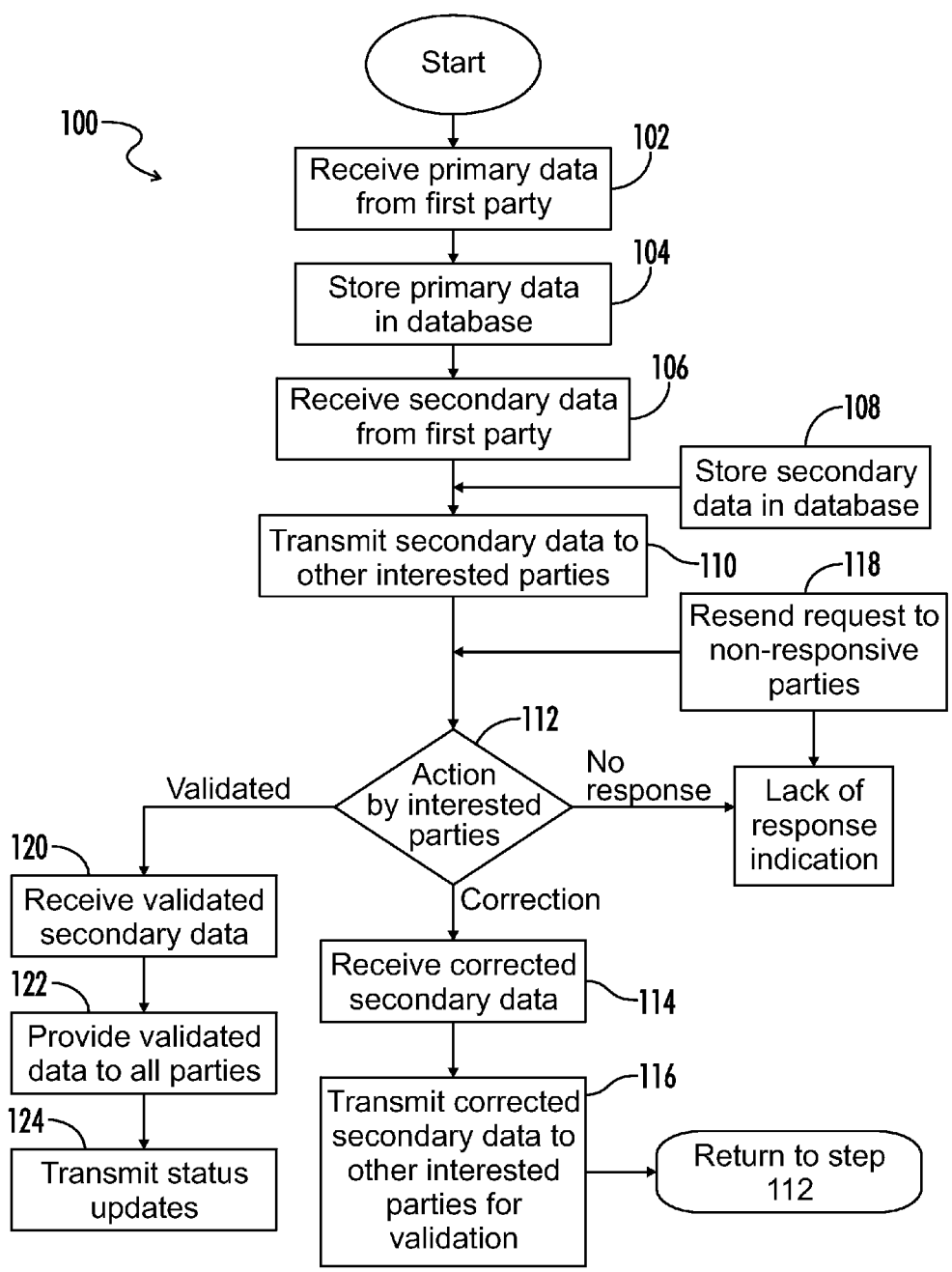
FIG. 2 is a flowchart showing an embodiment of a data validation method in accordance with the present invention.

Referring now to FIGS. 1-2, a method 100 of collecting and validating data in accordance with the system 10 of the present invention may be described. The method 100 begins in step 102 when primary data is received by the data receiving module 26 of the data processor 16 from a first party 22 via the user interface 12 and the communications network 20. The first party 22 may be the creator or originator of the primary data, but the method does not require this to be the case, as described in greater detail below.

The method may include a step 104 wherein the received primary data is stored by the data storing module 28 of the data processor 16 in the online database 14. In various embodiments the data storing module may perform for example a digital escrow service function as known in the art. In embodiments of the present invention, the receiving and storing steps 102, 104 may rather be described as a single step where for example the instructions executing these steps are performed by a single software module.

In various embodiments the first party 22 may be required to log on or otherwise provide security information included within the user interface 12 in order to transmit the primary data. The login or security information may establish an identity for the first party 22 such that the source of the primary data may be confirmed if desired. In other embodiments where some proof of creation for example is required, the step of storing data 104 may be suspended until after predetermined criteria regarding substantiation of the first party or of the primary data have been met. Systems and methods for logging in or otherwise securing access to a user interface such as a website are well known in the art and will not be described further herein.

Continuing to step 106, secondary data is also received by the data receiving module 26 of the data processor 16 from the first party 22 via the user interface 12 and the communications network 20. The secondary data is generally associated with the primary data and with one or more interested parties 24, with the one or more interested parties 24 generally including the first party 22 who provided the data, although in certain embodiments the first party 22 may not be an interested party 24 prior to submitting the primary and secondary data, such as where a new set of secondary data (i.e., an assignment or license) is provided by a new assignee with regards to a preexisting primary data, as further described below.

"Interested parties" as used herein generally refers to any parties 24 that are associated with the primary and/or secondary data such that their input may be necessary for validation of the primary and/or secondary data, and/or may be acceptable for correction of the secondary data. In various embodiments certain parties may only be interested parties with respect to portions of the secondary data as identified by the first party. Further, in certain embodiments "interested parties" may include parties that are not necessary for validation of secondary data but that may be affected by for example corrections to the secondary data and are designated by the first party to receive notice at various stages of the process.

The various types of "interested parties" may be context-specific as will be understood to one of skill in the art regarding whatever industry to which the system and method of the present invention is being applied. As but one example, where the system and method of the present invention is applied for life cycle copyright management, "interested parties" may include certain parties such as co-authors or co-creators, representatives, publishers, owners of a percentage of a copyrighted work, whether by contract, assignment or by license, or any others as may be designated by the first party upon initial submission of the primary data or confirmed as such at various other times.

In various embodiments, the distinction between "primary" and "secondary" data may include primary data being data that does not require validation or permit correction from other interested parties besides the first party, while secondary data is that which does require validation or permit correction from each interested party 24. As one example, the primary data may be a title or heading for a block of information including the secondary data, where the secondary data requires the validation of all parties associated with the information. In another example, the primary data may be a visual, audio, literary, or other form of copyrighted work that is provided by the first party, ostensibly as author or creator of the copyrighted work and therefore not for revision by other parties. In this example, the secondary data may be details associated with the work such as descriptions of the work or links to the work, authorship percentages, ownership percentages, etc.

Further relating to the example of copyrighted works, a particular work (primary data) may be associated with a plurality of sub-headings representing each exclusive right of use. Secondary data may be provided and validated with respect to each of the exclusive rights under the different sub-headings, as the interested parties with respect to each right frequently vary. In various embodiments all interested parties to the copyrighted work may be included generally for validation and confirmation purposes, regardless of their level of interest in a particular right or sub-heading at issue in a particular transaction.

In various embodiments, the primary data after entry by a first party and validation by interested parties may be stored and prevented from being subsequently corrected or deleted.

In alternative embodiments, it may be permissible that interested parties 24 adjust primary data. As one example, the primary data submitted by the first party 22 may then be stored as a first primary data, wherein the adjusted or corrected primary data may then be a second primary data which is stored separately. Where the first primary data is a copyrighted work such as for example a song, the second primary data may be a derivative work which is associated with the first primary data but has its own associated secondary data and requires additional and separate validation. In such embodiments, it is anticipated that secondary data with regards to a second primary data may for example include references to the first primary data from which the second primary data is derived.

In various embodiments, it may be desirable for the first party to be able to adjust secondary data without entering the primary data, but merely by reference to primary data that has already been entered. It may further be desirable for interested parties to be able to adjust secondary data as well, if so designated to have such access. For example, where an assignment of ownership rights with regards to a preexisting primary data (i.e., copyrighted work) from one or more interested parties to another one or more parties (whether previously interested or not) is to be entered and stored as secondary data to adjust the original secondary data ownership rights, either of the assignee or the assignor may be able to enter the assignment with reference only to the primary data. Where such an assignment takes place from one or more interested parties to previously non-interested parties, the assignment (adjusted secondary data) procedure in certain embodiments may be limited to the assignor so as to designate the assignee as an interested party with access to the data generally, although it is anticipated that in various embodiments the assignee may be able to supply the assignment data with reference to preexisting primary data and rely on assignor validation as described below to designate the assignee in an equivalent manner. In either of these cases, certain steps of the method may be skipped as being unnecessary given the circumstances.

Returning to FIG. 2, the method 100 may further include a step 108 wherein the received secondary data is also stored by the data storing module 28 of the data processor 16 in the online database 14. In embodiments of the present invention, the receiving and storing steps 106, 108 may rather be described as a single step where for example the instructions executing these steps are performed by a single software module.

Continuing to step 110, the secondary data is transmitted by the validation module 30 of the data processing system 16 to interested parties 24 along with a request for validation or correction of the transmitted secondary data. Generally, the secondary data may automatically be transmitted in response to receiving the data from the first party 22, and may be transmitted via the communications network 20 for example to electronic mail accounts or equivalent applications for portable electronic devices associated with the interested parties. In various embodiments, the interested parties 24 may be prompted to simply reply in the affirmative or the negative regarding validation of the secondary data, which prompt may further be generally configured for response using a single click by the interested party. Further, where correction of the secondary data is desired by one or more of the interested parties 24, only the portions of the secondary data requiring correction may be necessary to highlight and/or correct. In this manner the interested parties 24 as a collective group may provide a single result with a minimal amount of data entry.

The validation module 30 may transmit the secondary data in certain embodiments to all of the interested parties 24, or merely any interested parties other than the first party 22. In alternative embodiments, the secondary data may be transmitted to one or more interested parties 24 that have been identified by the first party 22 as being necessary for validation, while the secondary data is not transmitted to one or more interested parties 24 that have been identified by the first party 22 as not being necessary for validation. In even further alternative embodiments, the secondary data may be transmitted to all interested parties 24, with a validation or correction request only supplied to one or more interested parties as identified by the first party 22. Alternatively, the secondary data may be transmitted to all interested parties 24 along with a request for validation or correction of the secondary data, wherein one or more of the interested parties as identified by the first party 22 are not necessary for validation.

Continuing to step 112, data may or may not be received from the interested parties 24 at the data processor 16 via the user interface 12 and the communications network 20, or in any other permissible manner such as for example by standard mail. The method 100 may then respond to data received from the interested parties depending on the form of the response.

If one or more interested parties 24 transmit corrected secondary data to the data processor 16, the method 100 continues to step 114. The validation module 30 receives the corrected secondary data and determines whether or not the correction requires further action by the other interested parties. In step 116, the validation module 30 transmits the corrected secondary data to the other interested parties for validation or further correction. Generally, any corrected secondary data may be automatically transmitted for review by the other interested parties, but in certain embodiments this may not be automatic, or one or more interested parties may have been identified as not being necessary for validation, in which case the correction may not alone preclude validation of the secondary data by the remaining interested parties.

If one or more of the interested parties 24 fail to respond to the validation request, in step 117 a lack of response indication may be received by the validation module 30. This may in various embodiments simply be a trigger that occurs after a response has not been received within a predetermined amount of time, although alternative methods of indicating a failure to respond may perform an equivalent function. Continuing to step 118, the validation module 30 may then resend the validation request to the non-responsive interested parties. The method 100 may in certain embodiments include a counter (not shown) to determine where after a predetermined number of attempts to contact one or more non-responsive interested parties, the validation request is no longer transmitted. The remaining interested parties may be so alerted, either by a transmitted notice or by attaching of a notice to the stored secondary data in the online database, wherein any parties accessing the secondary data will be apprised of the failure to validate the data.

When each of the interested parties 24 have in step 120 responded affirmatively and validated the secondary data, either in the original form provided by the first party 22 or in a corrected form as provided by one or more of the interested parties as described above, the method continues to step 122. The primary and secondary data may then be marked as validated and provided for access and display via the user interface 12. Third parties that were not otherwise associated with the primary and secondary data, but who may have commercial, academic or other potential interest in the data, may then access the data directly through for example a website associated with the user interface. In various embodiments, and more desirably, third parties may also be able to access the data indirectly using for example third party search engines to locate and link to the data without having to locate the user interface of the system or even being aware of the system.

Once data has been validated and provided for display, various subsequent actions may trigger intermediate steps of the method. For example, changes to secondary data may be submitted and a validation request sent to interested parties without requiring entry of primary data. In various embodiments, the method may further include a step 124 of transmitting subsequent status updates to one or more interested parties based on predetermined criteria. The criteria may include for example a lapse of a period of time specific to the data, such as a contractual provision, a term of copyright, or may be merely a periodic status update automatically provided by the system. In embodiments where not all interested parties are supplied with notice of each change to secondary data as it occurs, the status updates may be provided to for example apprise all interested parties of the most current secondary data.

In various embodiments the method may further include a step of generating a certificate of creation for a creator/author of a work after initial entry of a work (primary data). The certificate may be maintained in a file within the system and associated with the creator/author, or may alternatively be reproduced in a physical form and transmitted to the creator. In any event, a certificate of creation may provide tangible proof of creation at a particular time and in a particular location by the creator/author, even without for example formal copyright registration.

In various embodiments the method may similarly further include a step of generating a certificate of assignment for an assignee of a preexisting work (primary data). The certificate may be maintained in a file within the system and associated with the assignee, or may alternatively be reproduced in a physical form and transmitted to one or both of the assignee and assignor. A certificate of assignment that is associated with the primary data for public display may further provide a tangible and legal proof of ownership with respect to a particular date, which may potentially be of great importance in assignee/assignor dispute settlement or for facilitating subsequent licensing of the primary data rights by third parties.

In an embodiment the method may include an option for registration of an assignment or equivalent transfer of ownership rights with the Library of Congress. The relevant parties may be prompted for a signature and the relevant documents filed automatically by the system without otherwise requiring any user input, thereby even further facilitating the filing of documents that might be useful for third parties seeking ownership information.

Figure 3:
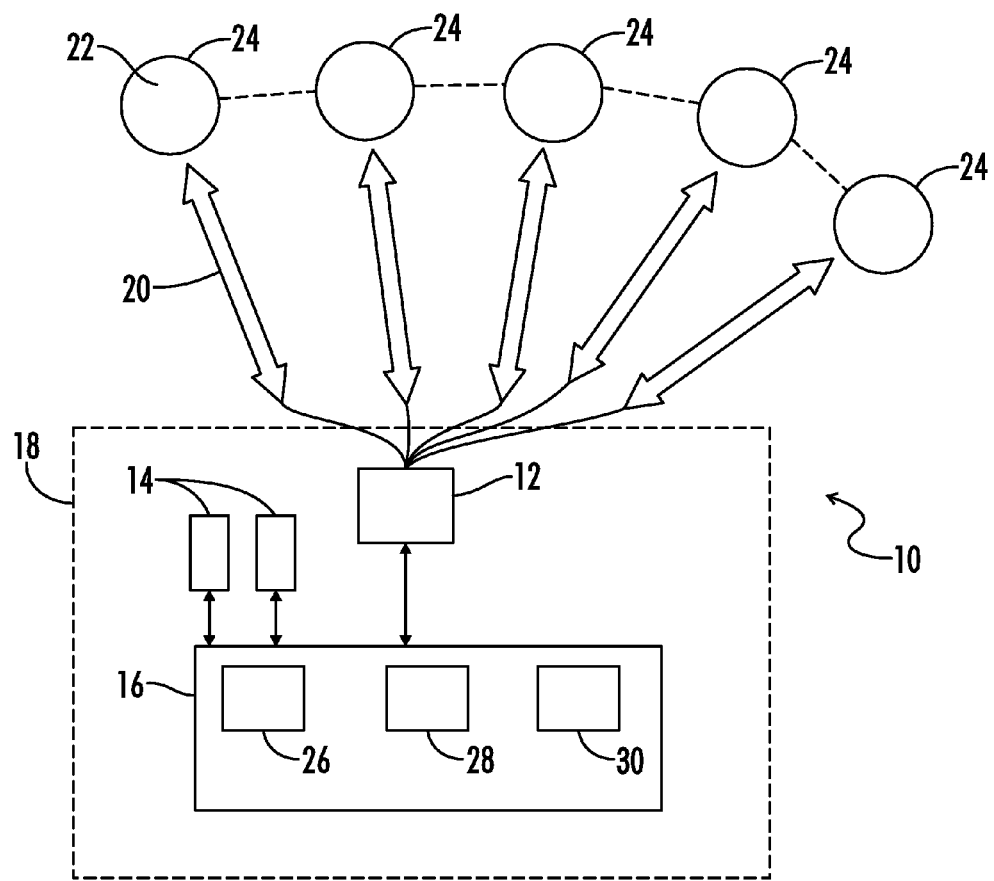
FIG. 3 is a block diagram of an alternative embodiment of the system of FIG. 1.

Referring now to FIG. 3, the system 10 may include a second database 15. In an embodiment the data receiving module 26 and data storage module 28 may be configured to receive and store only a representative portion of the primary data in the second database 15. The representative portion may include a "fingerprint" of the primary data as known in the art, which enables the remainder of the primary data to be easily identified and accessed where the representative portion has been selected. In this manner the storage requirements and therefore the costs of usage for users may be lessened. In certain embodiments only the second database 15 configured to receive representative portions will reside on the server for operative connection to the data processor 16. In other embodiments the system 10 may include both the first 14 and the second database 15, where for example a hard copy of the primary data may be stored in the first database for access as needed and requested while the representative portion is stored in the second database for availability in searching and identification features.

Figure 4:
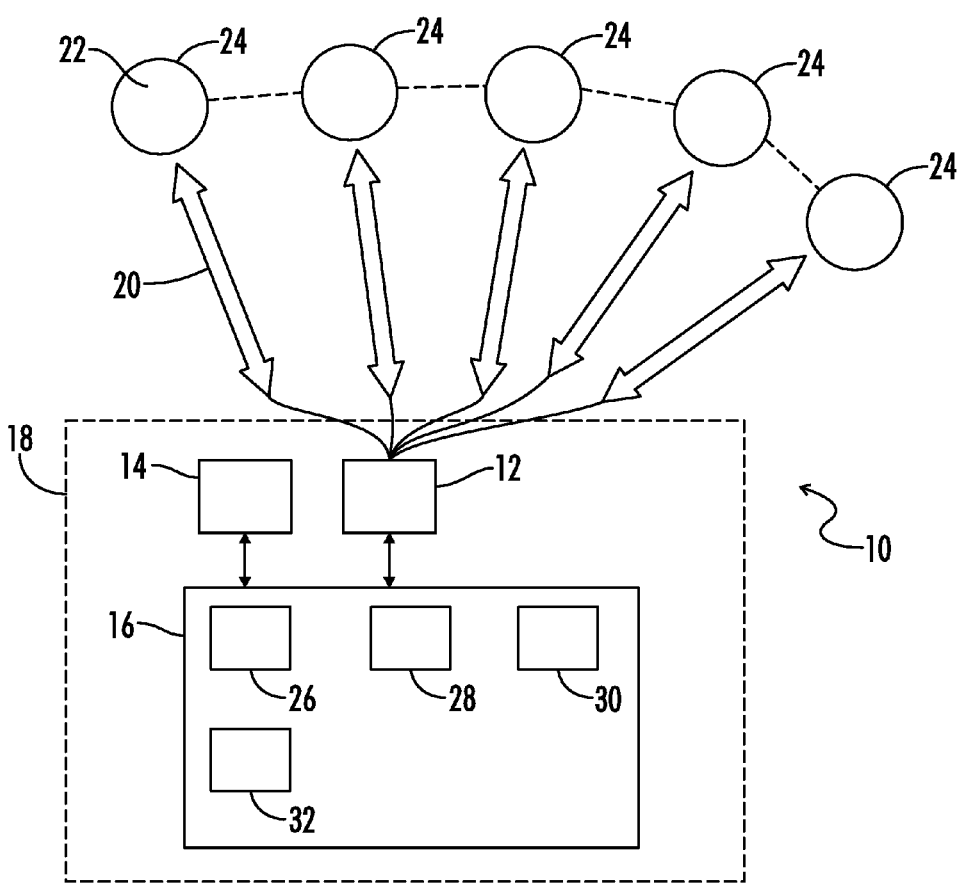
FIG. 4 is a block diagram of another alternative embodiment of the system of FIG. 1.

Referring now to FIG. 4, the data processor 16 may further include a confirmation module 32. The confirmation module 32 may in various embodiments automatically transmit a confirmation request to any interested parties 24 as identified by the first party 22, prior to transmitting secondary data along with a validation request. In this manner the secondary data validation requests are only extended to interested parties 24 that have confirmed themselves to in fact be associated with the primary and secondary data in question, and avoids any unfortunate transmission of secondary data to unrelated parties. Upon receiving confirmation of the status of an interested party via for example the user interface, the confirmation module 32 may then permit the validation module 30 to transmit validation requests and secondary data as described above.

In alternative embodiments, the confirmation module 32 may merely determine whether or not a preexisting confirmation of the status of an interested party is stored in the system. If the status is not confirmed, a confirmation request may be transmitted along with the validation request rather than separately. If the status is preexisting and confirmed, no confirmation request needs to be transmitted at all.

The system and method of the present invention as described with reference to FIGS. 1-4 above may apply generally to various types of primary and secondary data, wherein a number of interested parties may collectively create, amend, and validate a body of work with a minimal amount of data entry and with a desired assurance of validity in the finished product. In various embodiments, the present invention thereby further creates opportunities in the field of copyrighted works in that access is facilitated for potential third party users such as licensees or purchasers via a social communications network. Third party users may be far more likely to make use of works through the present invention, as incentives are provided for creative development in derivative works where more information regarding the copyrighted work is available, and financial incentives are further provided thereby for those creating the original works (primary data) in the first place.

Referring to FIGS. 6-9, a method 200 of the present invention may be described for using an online database system in accordance with various embodiments as described above for validating details (secondary data) associated with materials such as a copyrighted work (primary data). The method 200 is not intended to be exclusive to life cycle copyright management, and life cycle copyright management may in various embodiments further be conducted using the method 100 of FIG. 2.

Figure 6:
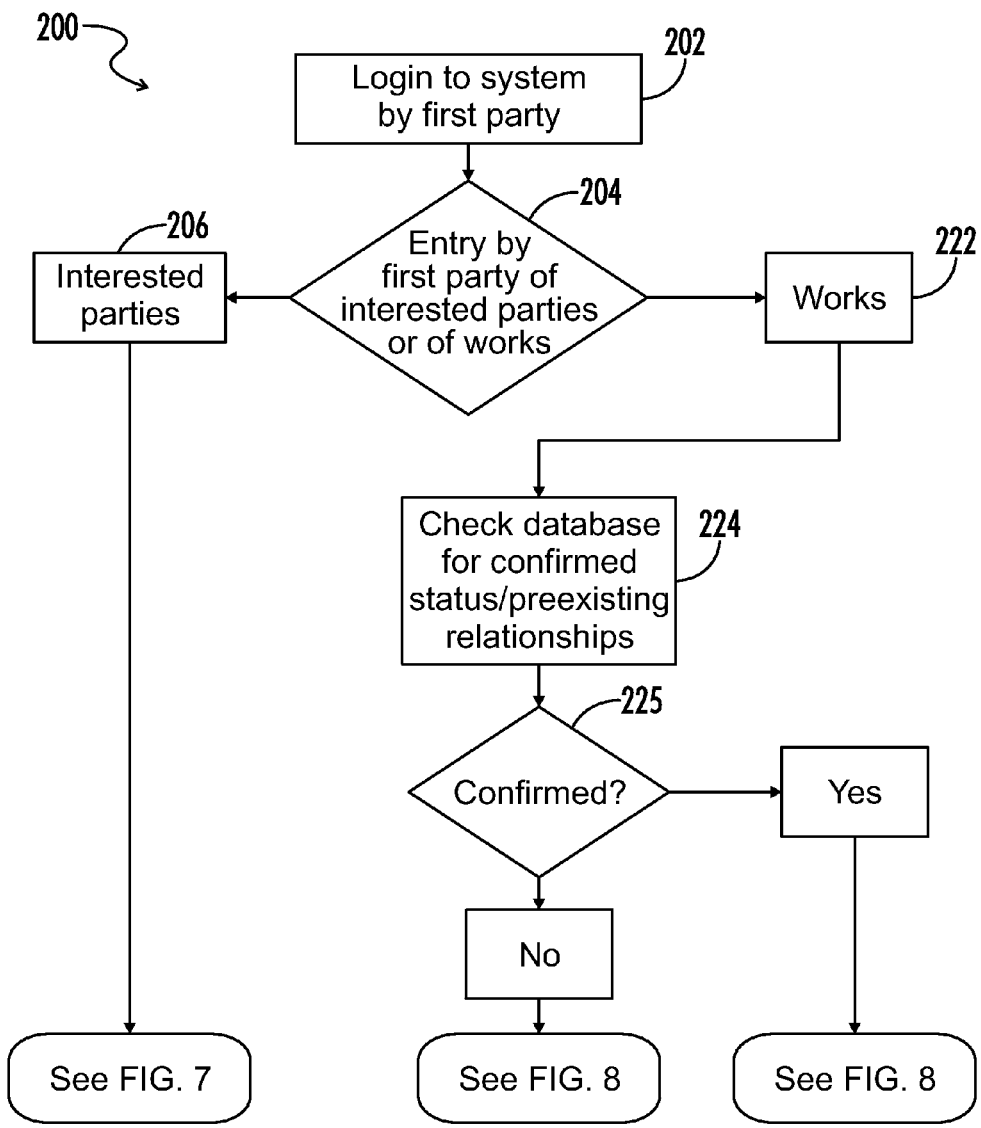
FIG. 6 is a flowchart showing another embodiment of a data validation method in accordance with the present invention.

Referring now to FIG. 6, the method begins in step 202 with a first party logging into the system. The system may be accessed online via a social communications network, although in some embodiments other points of access may be anticipated as well. The first party may for example be required to log in using security measures as known to one of skill in the art such as a previously acquired user ID and password. The security access available may be specific to a selectable access level having particular features, for example. Alternatively, access to the system may be available generally without specific entry requirements. In various embodiments the log in step 202 may only be required one time, and the first party thereafter provided with a link to access the system automatically from various alternative interfaces within the communications network and carry out later steps of the method directly.

In step 204, the first party may be prompted to enter into the online system either of one or more interested parties or a work (primary data) and associated details (secondary data). Frequently, a first party having access to the online system sufficient to enter/upload a work may be an author or creator of the work in question, but in various examples or embodiments it may be anticipated that other sources may enter the work and validate full ownership by other parties. For example, where a new work is provided, the first party may generally be a creator or author of the work. However, where preexisting works are provided (i.e., "legacy" works) along with new details associated with the preexisting work, the first party in such a case may be any interested party such as a business representative, publisher, co-owner, etc. In a particular example, a preexisting work may be provided with details which serve to identify a dispute regarding ownership or creation of the work that may have developed in part through prior lapses in communication.

As described above, the first party in this step may submit either a full copy of the work or a representative portion of the work such as for example a "fingerprint" wherein the full copy of the work may be readily obtained as necessary. In various embodiments the first party may not be prompted by the system to enter primary and/or secondary data, but the system may provide a platform wherein the first party may at any time link to the system and unilaterally submit data from an external interface. For example, the first party may create a work on a third party software platform and subsequently upload the work directly into the system, the first party having previously created an account or otherwise logged into the system. The method described herein may in such examples include a separate step of prompting the first party in response to receiving the work (primary data) to submit details (secondary data) associated with the work so received.

Figure 7:
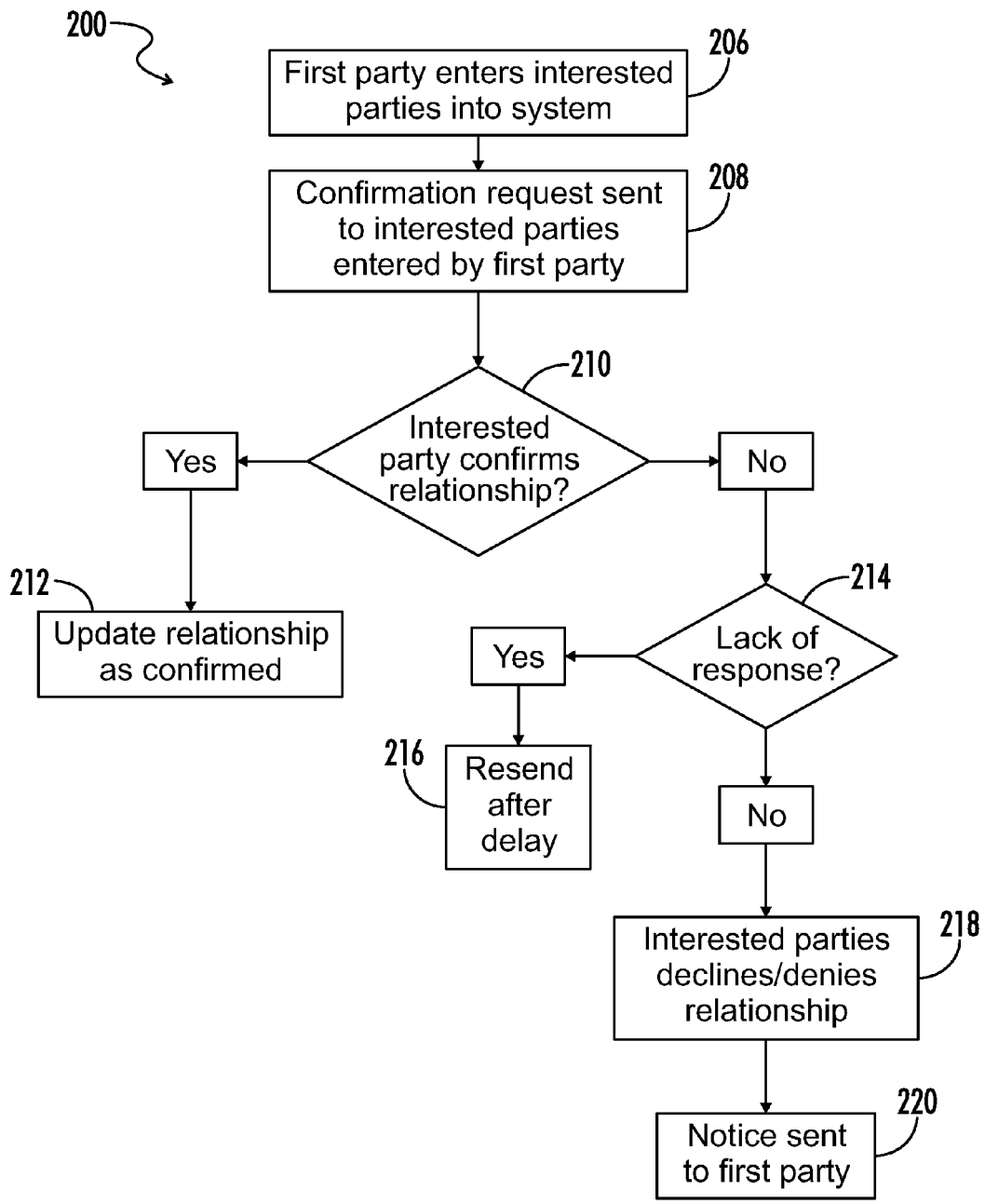
FIG. 7 is a flowchart showing a relationship confirmation process associated with the method of FIG. 6.

If interested parties are entered by the first party in step 206, in various embodiments the method may continue to a relationship confirmation process as shown in FIG. 7. In step 208, a relationship confirmation request is automatically sent by the online processing system to the one or more interested parties entered by the first party. The confirmation request may be sent via the communications network or in any equivalent manner. In step 210, the method either receives confirmation or does not. Where confirmation of the relationship as provided by the first party is received from an interested party, in step 212 the relationship is designated as confirmed and stored in for example an online database associated with the first party. Where confirmation of the relationship is not received from the interested party, in step 214 the method determines an appropriate next step. If no response has been received from the interested party at all, the method may continue in step 216 by resending the confirmation request to the interested party. The system may optionally have a predetermined delay time before such follow-up requests are resent, such as for example two days from the initial request. If the interested party does in fact respond, but a response is received by the system in step 218 indicating in the negative that a relationship with the first party does not exist, the system may in step 220 update the relationship as being declined and send notice of the same to the first party. Optionally, the system may also send notice of a declined relationship to one or more other associated interested parties entered by the first party.

Returning to FIG. 6, if the first party instead enters data such as works and details into the online system, the data is received by the system in step 222. In an embodiment, the details (secondary data) entered by the first party may include information regarding interested parties such as for example additional creators and/or representatives such as business owners that are presented in association with the works. In addition to merely establishing a relationship between the parties, indicating for example that two or more parties co-authored the work and/or two or more parties share ownership of the work, it is anticipated that in many cases there may be a difference from the parties' perspectives as to authorship and ownership percentages. In other embodiments, the secondary data may include other details such as relevant dates or other descriptive information with regards to the work (primary data), but for the purposes of this description the authorship and ownership percentages will be the primary focus.

In step 224, the online database is reviewed for existence of pre-confirmed relationships between the first party and the interested parties referred to in the details. If the system determines in step 225 that the relationships have previously been entered and confirmed, the method continues as described below in this section with reference to FIG. 9. If the system instead determines in step 225 that the relationships have not previously been entered and confirmed, the method continues with reference instead to FIG. 8.

Figure 8:
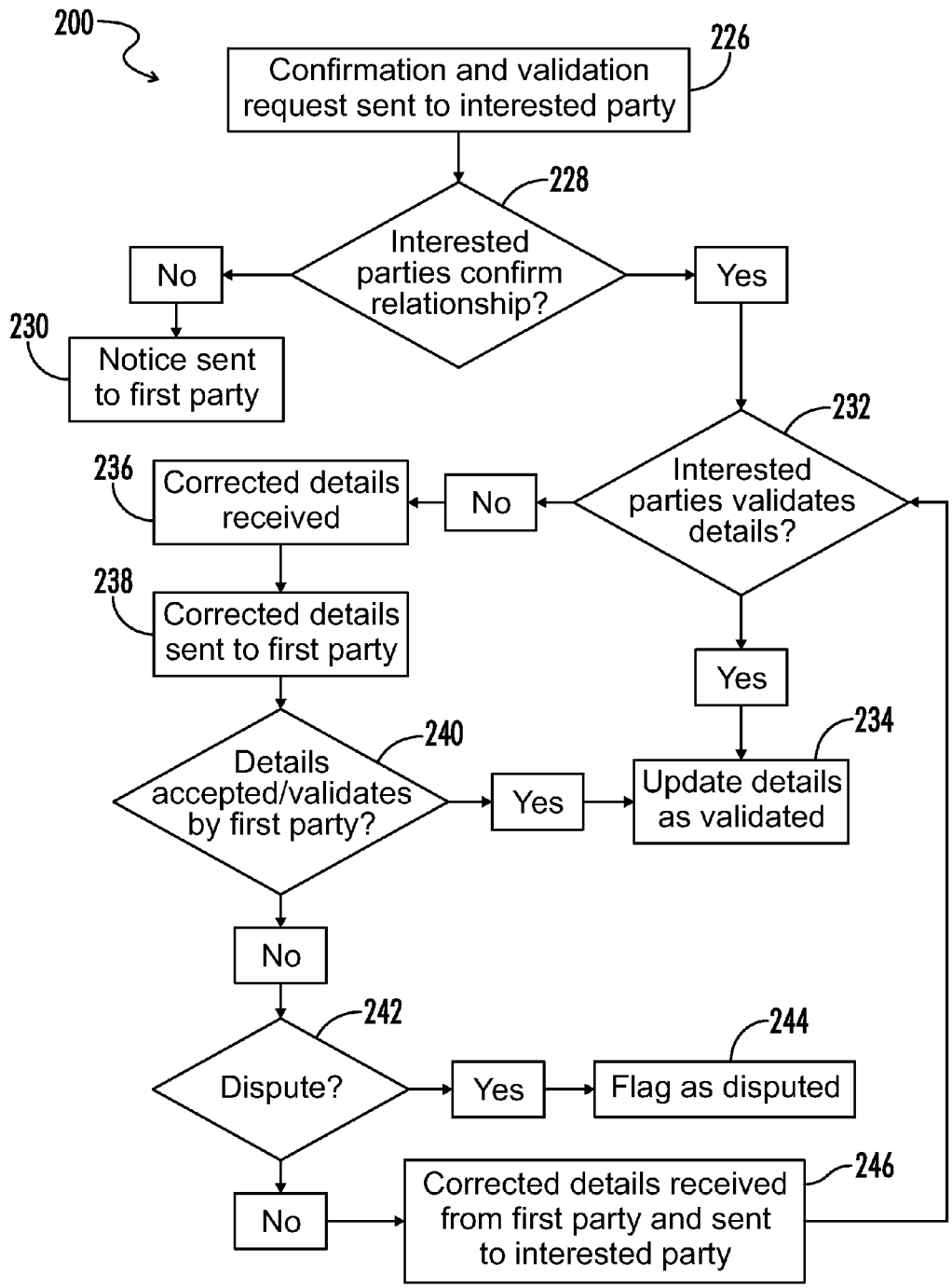
FIG. 8 is a flowchart showing a validation process associated with the method of FIG. 6 where the relationship is not previously confirmed.

Referring now to FIG. 8, where no record is found of a confirmed relationship between the first party and an interested party such as a co-author or co-owner of the entered work, the processor of the online system may combine within a single communication a confirmation request with regards to the relationship with the first party and a validation request with regards to the entered details (in this case the authorship and/or ownership details). In various embodiments the single communication may be an electronic notification with simple one-step responses available for confirmation and/or validation, but other methods of communication are anticipated where feasible or desired. This may particularly be the case where the interested party is unavailable by electronic communications, for example either geographically or voluntarily.

In step 228, the system determines whether or not the relationship is confirmed by the interested party. If the relationship is not confirmed, the process terminates in step 230, and the first party must enter a relationship request separately from entry of the work if the interested party is in fact intended to be associated with the work. If the relationship is in fact confirmed, the process continues in step 232 by determining whether or not the details entered by the first party have been validated by the interested party. If the interested party has validated the details, the process continues to step 234 by designating the details as having been validated by both parties, and storing the designation for example alongside the details in the online database.

If the interested party does not validate the details as presented by the first party, the interested party may correct the details in step 236. For example, where the interested party is a co-author of the entered work, he/she may recommend a different authorship percentage split from that proposed by the first party and submit this recommendation to the system. After receiving the corrected details, the system then submits the corrected details to the first party in step 238. If the first party now accepts the recommended details (or for example authorship split), the system receives the accepted or validated corrected details in step 240 and the process continues to step 234.

If the first party does not accept the corrected details or recommended split submitted by the system from the interested party, the system in step 242 may offer a dispute flag wherein the validation may be designated as being disputed. If the first party indicates that the validation should be disputed, the process continues to step 244 and performs the necessary operations. The various effects of a disputed validation may include merely an indicator stored in the database and linked to the stored details, or may further include other processes to resolve the dispute. If the first party instead submits another set of corrected details with respect to the corrected details submitted by the interested party, the new corrected details are received by the system in step 246 and submitted to the interested party again in a repeat of step 232 for further review.

Figure 9:
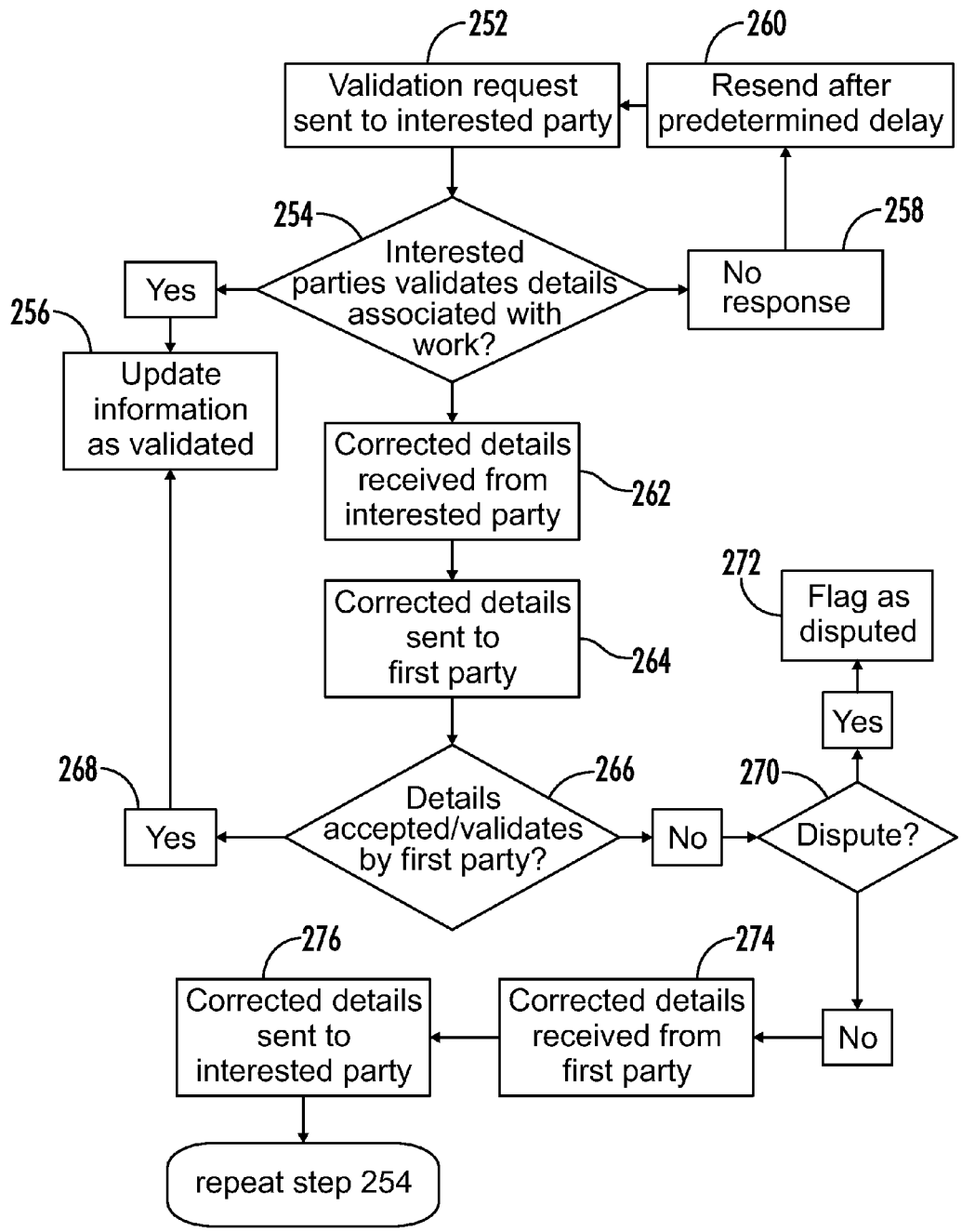
FIG. 9 is a flowchart showing a validation process associated with the method of FIG. 6 where the relationship is previously confirmed.

Referring now to FIG. 9, where the relationships described above with reference to FIG. 7 have previously been entered into the system and confirmed by each of the parties the method continues in step 252 by sending a validation request to interested parties with regards to the entered details (in this case the authorship and/or ownership details). In various embodiments the validation request may be an electronic notification with simple one-step responses available for confirmation and/or validation, but other methods of communication are anticipated where feasible or desired. This may particularly be the case where the interested party is unavailable by electronic communications, for example either geographically or voluntarily.

In step 254, the system determines whether or not the details entered by the first party are validated by the interested party. If the interested party has validated the details, the process continues to step 256 by designating the details as having been validated by both parties, and updating or storing the designation for example alongside the details in the online database.

If no response has been received from the interested party at all (step 258), the method may continue in step 260 by resending the validation request to the interested party. The system may optionally have a predetermined delay time before such follow-up requests are resent, such as for example two days from the initial request.

If the interested party does not validate the details as presented by the first party, the interested party may correct the details in step 262. For example, where the interested party is a co-author of the entered work, he/she may recommend a different authorship percentage split from that proposed by the first party and submit this recommendation to the system. After receiving the corrected details, the system then submits the corrected details to the first party in step 264. If the first party now accepts the recommended details (or for example authorship split), the system receives the accepted or validated corrected details in step 268 and the process continues to step 256.

If the first party does not accept the corrected details or recommended split submitted by the system from the interested party, the system in step 270 may offer a dispute flag wherein the validation may be designated as being disputed. If the first party indicates that the validation should be disputed, the process continues to step 272 and performs the necessary operations. The various effects of a disputed validation may include merely an indicator stored in the database and linked to the stored details, or may further include other processes to resolve the dispute. If the first party instead submits another set of corrected details with respect to the corrected details submitted by the interested party, the new corrected details are received by the system in step 274 and submitted to the interested party again in step 276 for further review.

In various embodiments the method may include repeated sequences of validation requests and corrected details, with the number of repetitions having a predetermined maximum or perhaps continuing until one or more of the parties either labels the validation as being disputed or simply terminates the process.

While the method as shown refers to a single interested party, it is anticipated that the process may be carried out simultaneously with a plurality of interested parties as necessary depending on the number of, for example, authors or owners of a given work entered by the first party. Where corrected details are submitted by a single interested party, it may be necessary for the system to submit the corrected details to all other interested parties for subsequent validation. Alternatively, in various embodiments the interested parties may likely have different classifications wherein only a certain group of interested parties are related to each other, even where each of the interested parties have some relationship with the first party and the entered work. Further, one or more of the interested parties may be associated with the first party and/or the entered work but not particularly necessary for validation of the details submitted by the first party. For example, a party may be entered as interested because they are a licensee but they may not have an ownership percentage that would require their participation in the process, and the entered details may be designated as validated by the system even where the licensee fails to respond to a validation request.

Returning again to FIG. 6, where the system determines in step 225 that a relationship status has been previously confirmed the process continues as shown in FIG. 9. In step 252 a validation request is submitted by the system to the one or more interested parties associated with the details entered by the first party. The remaining steps of the process following this step are substantially the same as various steps shown by and described with respect to FIG. 8, and further description will be eliminated herein as unnecessary.

Figure 5:
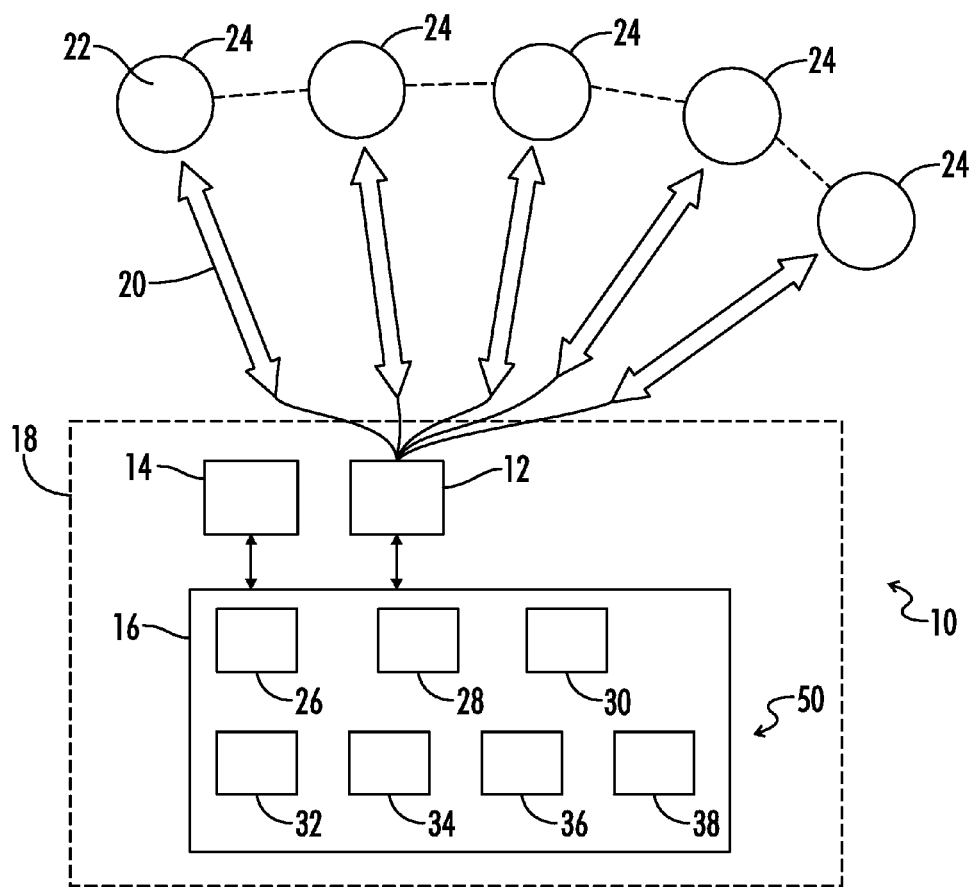
FIG. 5 is a block diagram of another embodiment of a data validation system in accordance with the present invention.

Referring now to FIG. 5, a system 50 of the present invention generally includes the system components of FIG. 1. The system 50 may however include one or more additional software modules that are more particularly related to life cycle copyright management, although these modules are not necessarily exclusive to life cycle copyright management, and life cycle copyright management may in various embodiments further be conducted using the system 10 of FIG. 1 without any of the additional modules at all.

In certain embodiments a market valuation module 34 is provided wherein licensors or licensees, for example, may establish or otherwise determine a market value for a particular work. The market valuation module 34 may be accessed via the social communications network or through equivalent means such as a link from a third party web server. The market valuation module 34 may include another database (not shown) which aggregates data from a plurality of online sources. The appeal of a work with respect to peers may be compiled by receiving reviews or ratings via the communications network. Data may further be compiled from a variety of additional sources to assist in establishing an estimated range of values for particular types of uses.

In an embodiment, the market valuation module 34 establishes a local format in which users may enter information to establish the necessary values, whereas in other embodiments the market valuation module 34 may be programmed to seek out information from other sources as known in the art.

In another embodiment, the system may automatically track market value and alert interested parties when a threshold value has been reached for the work. Interested parties may in this way be advised to seek copyright registration for the work. A user of this system who might otherwise be loath to register all of his or her creations due to the effort and cost involved might more effectively determine which works to register when the market value dictates that registration would be beneficial at that stage in the life cycle of the work and in light of various predetermined criteria which may have further been met.

In various embodiments a listing module 36 is provided in the data processor 16 wherein works that are available for sale or licensing may be advertised or otherwise presented for display. Creators or owners may submit their works to the listing module 36 for market place search facilitation. Potential customers may view the works on the listing module 36 via the communications network or the equivalent and, if interested, may in certain embodiments utilize the user interface to access the owner or creator of the work. The listing module 36 also may enable searches by potential customers across a plurality of predetermined categories or criteria. The listing module 36 may further facilitate searches by permitting a potential customer to post criteria and request submissions via the social communications network.

In various embodiments the data processor 16 may include a real time information module 38 wherein works that are for example available anywhere on the Internet may be identified and linked to associated information. Each work upon being stored may be given a unique ID and a URL within the online database 14 of the system 50. A widget may be provided to identify a particular work located on a third party web page (for example Facebook, MySpace, YouTube, etc.) as having been registered with the system. The widget may further contain the unique ID and URL for the work, wherein selection of the widget by a user opens the webpage identified by the URL. A summary of the creators and representatives at that particular time may be provided to reflect up to date licensing contact information. If preapproved licenses have been made available for the work by the creators or representatives, a prospective licensee may further be presented with "one click" licensing opportunities.

The previous detailed description has been provided for the purposes of illustration and description. Thus, although there have been described particular embodiments of the present invention of a new and useful "System and Method for Data Validation and Life Cycle Management," it is not intended that such references be construed as limitations upon the scope of this invention except as set forth in the following claims.

What is claimed is:

1. A computer-implemented method of obtaining and validating data associated with a copyrighted work, the method comprising:
   generating a user interface display on a first electronic device, said user interface functionally linked to a web server via a communications network and configured for enabling a first party to submit to said web server each of:
   primary data comprising a copyrighted work, and
      secondary data comprising names of a plurality of owners comprising said first party and ownership percentages associated with each of said owners for one or more copyrights associated with the primary data;
      transmitting said primary data and secondary data to electronic devices associated with each of said owners other than the first party and displaying said primary data and secondary data on respective user interfaces for each of the owners;
      enabling each of the owners to validate the ownership percentages or to submit a correction comprising a revised ownership percentage via the user respective interface;
      sequentially enabling each of the first party and any of said one or more owners submitting revised owner percentages to selectively validate or correct previously submitted ownership percentages;
      upon validating ownership percentages for each of said owners, enabling the validated owners to pre-approve licenses of the copyrighted work;
      generating a social network user interface comprising a display field containing the primary data and validated ownership percentages and accessible via a social communications network, the social network user interface further identifying the copyrighted work as being pre-approved for licenses;
      generating a preapproved license of said copyrighted work in response to a user selection via said social network user interface; and
      wherein each of the first party and any one or more owners submitting revised owner percentages are sequentially enabled to selectively validate or correct previously submitted ownership percentages until a predetermined maximum number of corrections is reached, further wherein said copyrighted work is flagged as being in dispute with respect to said non-validated ownership percentage.

2. The method of claim 1, the social network user interface further identifying the work as being in dispute.

3. The method of claim 1, further comprising the step of responding to the first party upon receiving said primary data and requesting proof of association of said first party with said primary data.

4. The method of claim 1, further comprising the step of transmitting status updates to each of said owners with regards to said primary data, said status updates generated in accordance with adjusted secondary data associated with one or more of said owners.

5. The method of claim 1, further comprising the step of transmitting status updates to each of said owners with regards to said primary data, said status updates generated in accordance with a lapse of a period of time specific to the copyrighted work and associated with one or more of a contractual provision associated with one or more of said owners and a term of copyright associated with said copyrighted work.

6. The method of claim 1, further comprising compiling valuation data associated with said copyrighted work in an online database, said valuation data aggregated from a plurality of online sources via the communications network.

7. The method of claim 6, further comprising tracking said valuation data with respect to a predetermined threshold value, and alerting said plurality of owners when said valuation data exceeds said predetermined threshold value.

8. A system comprising:
   a web server functionally linked to a social communications network; a data processor; and
   a non-transitory computer-readable medium comprising program modules executable by the data processor to direct the performance of:
   enabling a first party to submit to said web server each of primary data comprising a copyrighted work, and secondary data comprising names of a plurality of owners comprising said first party and ownership percentages associated with each of said owners for one or more copyrights associated with the primary data;
   transmitting said primary data and secondary data to electronic devices associated with each of said owners other than the first party and displaying said primary data and secondary data on respective user interfaces for each of said owners;
   enabling each of the owners to validate the ownership percentages or to submit a correction comprising a revised ownership percentage via the respective user interface;
   sequentially enabling each of the first party and any of said one or more owners submitting revised owner percentages to selectively validate or correct previously submitted ownership percentages;
   upon validating ownership percentages for each of said owners, enabling the validated owners to pre-approve licenses of the copyrighted work;
   generating a social network user interface comprising a display field containing the primary data and validated ownership percentages and accessible via the communications network, the social network user interface further identifying the copyrighted work as being preapproved for licenses;

generating a preapproved license of said copyrighted work in response to a user selection via said social network user interface; and wherein each of the first party and any one or more owners submitting revised owner percentages are sequentially enabled to selectively validate or correct previously submitted ownership percentages until a predetermined maximum number of corrections is reached, further wherein said copyrighted work is flagged as being in dispute with respect to said non-validated ownership percentage.

9. The system of claim 8, the social network user interface further identifying the work as being in dispute.

10. The system of claim 8, further comprising the step of responding to the first party upon receiving said primary data and requesting proof of association of said first party with said primary data.

11. The system of claim 8, further comprising the step of transmitting status updates to each of said owners with regards to said primary data, said status updates generated in accordance with adjusted secondary data associated with one or more of said owners.

12. The system of claim 8, further comprising the step of transmitting status updates to each of said owners with regards to said primary data, said status updates generated in accordance with a lapse of a period of time specific to the copyrighted work and associated with one or more of a contractual provision associated with one or more of said owners and a term of copyright associated with said copyrighted work.

13. The system of claim 8, further comprising compiling valuation data associated with said copyrighted work in an online database, said valuation data aggregated from a plurality of online sources via the communications network.

14. The system of claim 13, further comprising tracking said valuation data with respect to a predetermined threshold value, and alerting said plurality of owners when said valuation data exceeds said predetermined threshold value.

* * * * *